Dec. 4, 1934.   C. L. SEWARD, JR   1,983,103
MAGNETIC COMPASS
Original Filed July 10, 1930   2 Sheets-Sheet 1
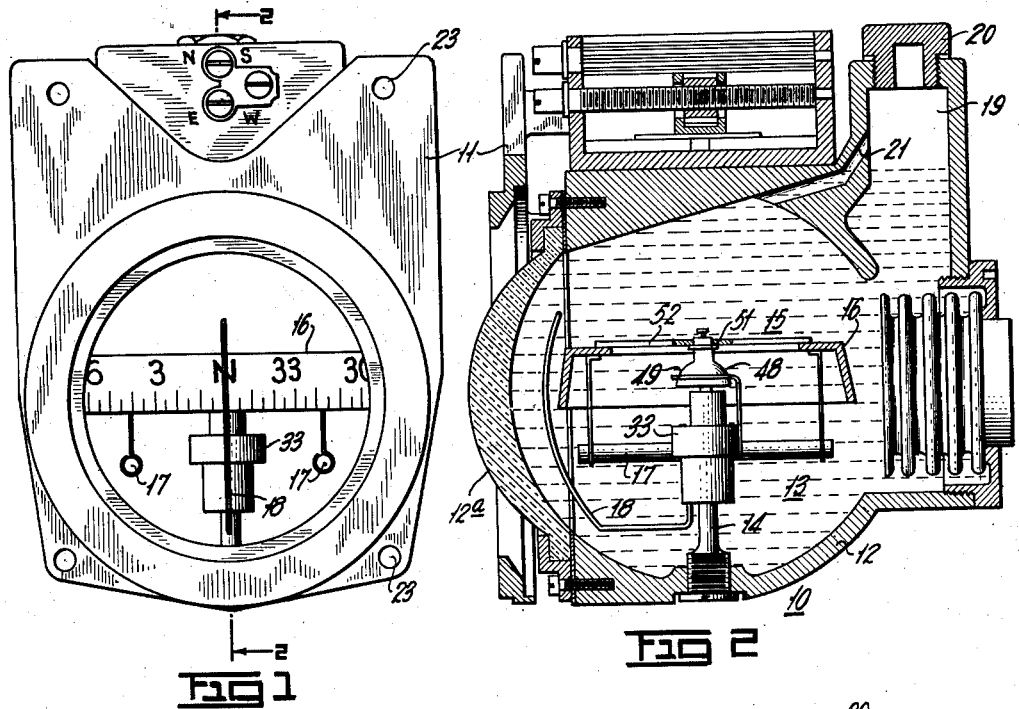
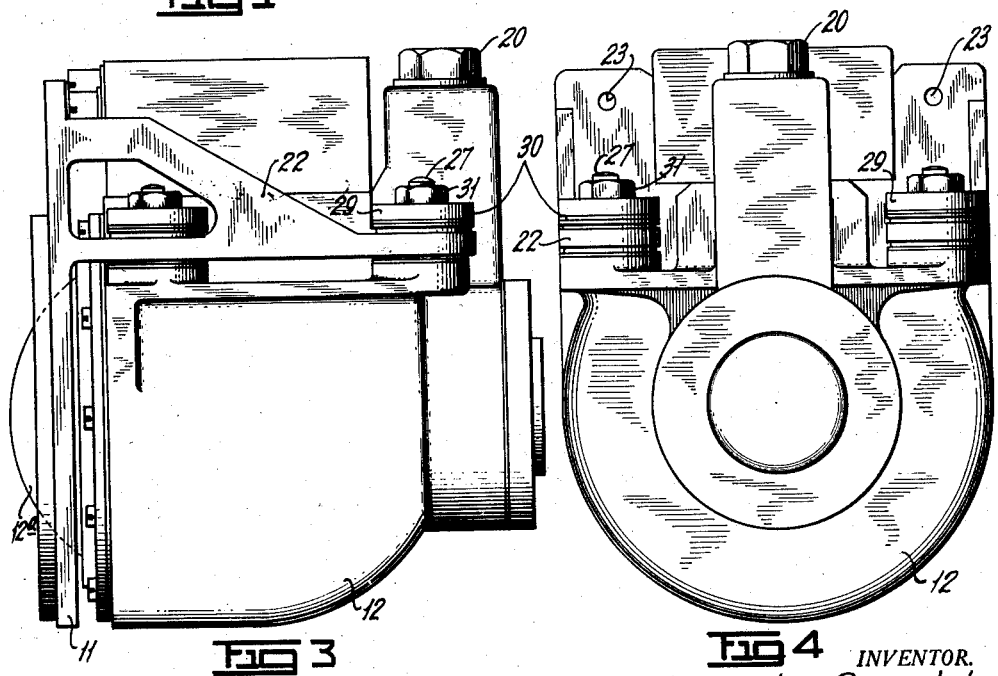
INVENTOR.
Clarence Lee Seward, Jr.
BY Stephen Cerstvik.
ATTORNEY Dec. 4, 1934.    C. L. SEWARD, JR    1,983,103
MAGNETIC COMPASS
Original Filed July 10, 1930    2 Sheets-Sheet 2
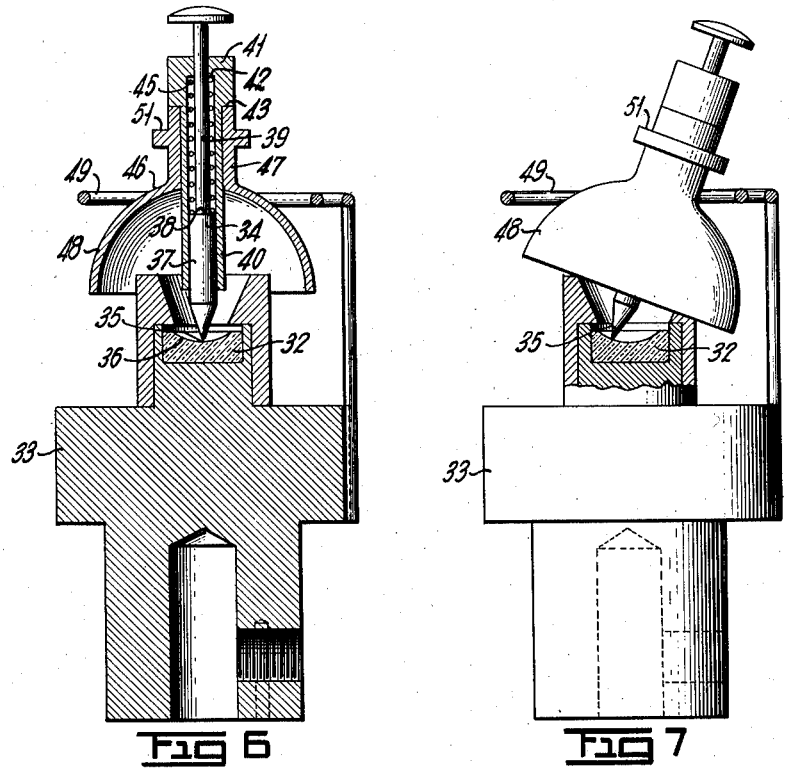
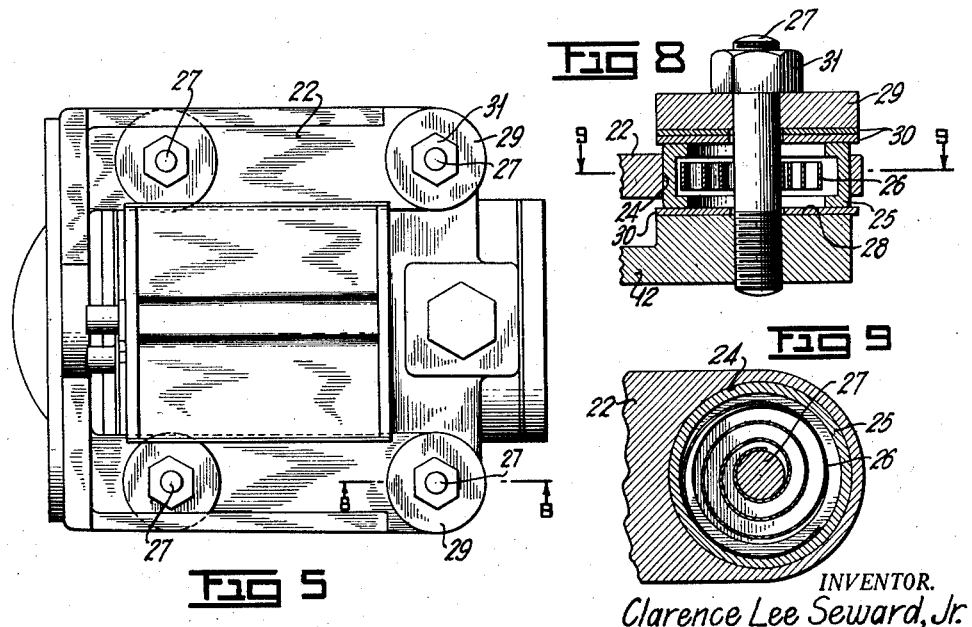
INVENTOR.
Clarence Lee Seward, Jr.
BY Stephen Cerstvik.
ATTORNEY Patented Dec. 4, 1934

1,983,103

UNITED STATES PATENT OFFICE 1,983,103

MAGNETIC COMPASS

Clarence Lee Seward, Jr., Washington, D. C., assignor to Bendix Aviation Corporation, South Bend, Ind., a corporation of Delaware Continuation of application Serial No. 466,994, July 10, 1930. This application January 10, 1933, Serial No. 651,034

15 Claims. (Cl. 248—30)

The present invention relates to magnetic compasses such, for example, as are adapted for use on aircraft and more particularly to supporting means therefor, and is a continuation of copending application Serial No. 466,994, filed July 10, 1930 for Magnetic compasses.

One of the objects of this invention is to provide, in connection with instruments of the above type, novel and improved means for supporting the compass as a whole, as well as the compass card or directive unit.

Another object is to provide a novel structure in a compass, embodying novel shock-absorbing means whereby vibrations and the spinning of the compass card of the compass are minimized, intensity of the forces imposed upon the jewel or supporting bearing thereof due to oscillation or vibration of the card are reduced, and a relatively light compass card construction with heavy magnets is permitted.

In accordance with the invention there is provided a compass housing or bowl which is suspended preferably at the top from a suitable supporting frame, shock-absorbing means or springs being incorporated in the support so that the transmission of vibrations in the horizontal plane from the supporting frame to the compass are greatly reduced or minimized. The compass card is also supported in a manner to reduce or to minimize impact forces imposed on the jewel bearing of the directive unit, i. e., shock-absorbing or spring means interposed between the card structure and the pivot in order that forces due to inertia of the card structure may be substantially absorbed or the intensity thereof reduced, thereby relieving the pivot and the jewel from the severe effects of such forces. Due to the yielding mounting in the horizontal plane, vibrations of the supporting structure, such as an aeroplane, are greatly moderated, whereby spinning of the compass card is minimized, and the shock-absorbing spring connection between the compass card and the pivot permits the use of heavier magnets in the card structure and provides a more durable pivot bearing. In view of the fact that the compass may be suspended from the top, space therebelow may be utilized for any other suitable instrument such, for example, as a turn indicator.

A further object of the invention is to provide a novel support for instruments of the aircraft type embodying yielding means interposed between the support and the instrument for preventing transmission of horizontal vibrations from the support to the instrument, and means providing bearing surfaces between the support and the instrument whereby smoothness of action is obtained upon relative movement between the support and the instrument.

A still further object is to provide, in a compass of the type including a compass bowl, a compass card pivotally mounted on a bearing carried by said bowl, and means to prevent vibration of the card and its bearing, the combination with said compass, of a novel support for the bowl and embodying yielding means interposed between the support and bowl for preventing transmission of horizontal vibrations from the support to the bowl, and means providing bearing surfaces between said support and said bowl whereby a smoother action is obtained upon relative movement therebetween.

The above and other objects and advantages of the invention will appear more fully hereinafter from a consideration of the detailed description which follows, when taken in connection with the accompanying drawings wherein one embodiment of the invention is illustrated. It is to be expressly understood, however, that the drawings are for the purpose of illustration and description only and are not designed or to be construed as defining the limits of the invention, reference being had for this purpose to the appended claims.

In the drawings wherein like reference characters refer to like parts throughout the several views:

Fig. 1 is a front elevation of one form of compass embodying the present invention;

Fig. 2 is a vertical sectional view taken along the line 2—2 of Fig. 1;

Fig. 3 is a side elevation of the compass showing the novel support therefor;

Fig. 4 is a rear elevation;

Fig. 5 is a plan view showing the supporting frame and the connection of the compass thereto;

Figs. 6 and 7 are enlarged detail views of the compass card supporting structure;

Fig. 8 is an enlarged detail sectional view taken on line 8—8 of Fig. 5 showing the spring connections between the supporting frame and the compass; and Fig. 9 is another enlarged detail sectional view taken on line 9—9 of Fig. 8.

Referring now to the drawings, the invention is illustrated as adapted to a compass shown generally at 10, connected to a supporting structure 11 by novel means to be described hereinafter, the compass embodying a housing or bowl 12 providing a chamber 13 within which is disposed a pivot post 14 supporting the compass card assembly 15, the latter embodying a card element 16 having the usual compass indicia thereon and having directive magnets 17 secured thereto in any suitable and well-known manner. The card 16 is adapted to cooperate with a lubber's line 18 which is stationary with respect to the card and carried by the post 14, for example. The chamber 13 is filled with a suitable damping liquid through an opening or well 19 having a closure 20; and the well or opening 19 is connected by a passage 21 to the upper-most portion of the chamber 13 so that the well or opening serves, in addition to its purpose as a filling opening, as a bubble chamber. The bowl is provided with a cover-glass in the form of a spherical lens 12a through which the compass card and lubber's line may be viewed.

The compass is also provided with a deviation compensator shown at the top thereof and with an expansible diaphragm device shown at the rear of the bowl on the interior thereof for compensating for the expansion and contraction of the damping liquid due to temperature changes. Since, however, these devices form no part of the present invention, a detailed description thereof is, therefore, unnecessary.

The housing or bowl 12 is not adapted to be directly or rigidly supported by the vehicle on which it may be mounted such, for example, as an aeroplane, but novel means are provided which are interposed between a supporting frame adapted to be mounted on an instrument board and the bowl, to provide for relative horizontal movement between the supporting frame and the compass, and thereby to reduce or moderate the transmission of vibrations in a generally horizontal direction from the supporting structure to the compass and hence, in this manner, spinning of the compass card is minimized. To this end, there is provided a horizontal suspension frame 22 secured to or formed as a part of the supporting structure 11, the latter having openings 23 (Figs. 1 and 4) for attachment of the supporting structure to an instrument board (not shown). The supporting frame 22 is provided with a plurality of openings 24 (Figs. 8 and 9), in the present instance four, within which the novel shock-absorbing means of the invention are located. Referring to the detail views shown in Figs. 8 and 9, each of said means comprises a housing 25, to the inner wall of which is connected one end of a spiral or clock spring 26 disposed about and having its inner end connected to a suspension post 27 carried by or formed integral with the compass housing or bowl 12. It is apparent, however, that other types of springs may be employed between the posts 27 and the support 22 or housing 25 and arranged in a manner different from that shown but adapted for taking up horizontal vibrations. The compass bowl 12 is provided with bearing surfaces 28 disposed about the posts 27, the upper end of each post being provided with a collar 29. Means are now provided for forming bearing surfaces between the support and the compass whereby relative movement is permitted therebetween with little or substantially no friction. As illustrated, said bearing surfaces are formed by rings or washers 30 of some suitable material such, for example, as phosphor-bronze and having openings larger than the posts 27, said washers 30 being interposed between the collar 29 and the suspension frame 22 and between the latter and the compass bearing surface 28 and are adapted to cooperate with the upper and lower faces of the housing 25, although the latter may be dispensed with, if desired, and the spring 26 may then be connected directly to the support 22 and the washers 30 placed directly against said support and against the bearing surface 28. Nuts 31 are provided which cooperate with the upper ends of the posts 27 in order that the shock-absorbing means may be held together with a desired degree of bearing tightness.

In operation, the suspension frame 22, if carried by an aeroplane, is subject to vibrations which are generally produced by the internal combustion engine operating the plane and by forces acting on the plane and maintaining it in flight. Due to the springs 26 and the bearing washers 30, however, the transmission of vibrations in a general horizontal direction to the compass housing are minimized or substantially eliminated, because the springs and the washers permit relative movement between the compass bowl and the suspension frame, said washers or rings providing supporting bearings which permit relative movement with little or no friction.

The compass card structure 15 is also supported in a manner to moderate the impact stresses, usually vertical, on the jewel bearing on which it is carried, and referring to Figs. 6 and 7 there is shown, a bearing member or jewel 32 carried by a supporting member 33 adapted to be connected to and carried by the pivot post 14 in any well-known manner. A spindle 34 is provided which has a pivot point 35 resting on the concave bearing surface 36 of the jewel 32. The spindle preferably includes a lower portion 37 having an upwardly-facing abutment surface 38 and a reduced portion 39 extending upwards of the surface 38, disposed about the spindle there is a sleeve 40, preferably made of brass, fitting the lower portion 37 and having its upper or head portion 41 fitting the reduced portion 39, and providing downwardly-facing interior and exterior abutment surfaces 42 and 43, respectively. Preferably, a coil spring 45 is disposed about the reduced portion 39 of the spindle and between the abutment surfaces 42 and 38. The compass card support 46 which is made of some suitable light-weight material such, for example, as aluminum, has a sleeve portion 47 encompassing and being fixed to the sleeve 40 and fitting against the exterior abutment 43, and is also provided with a lower spherically-surfaced member 48 with which is adapted to cooperate a keeper 49, the latter being carried by and secured to the supporting member 33 in any suitable manner. The member 46 is also provided with an abutment or collar 51 for carrying the supporting part 52 (Fig. 2) of the compass card structure 15.

Due to the arrangement of the spring 45 between the compass card structure and the pivot 34, impact forces which would otherwise be transmitted to the pivot from the compass card and its supporting structure would be greatly reduced. In other words, the compass card and its supporting structure may move relatively to the pivot in order to minimize impact of the latter on the jewel on account of inertia of the compass card and its supporting structure. The resilient connection between the card and its support also minimizes or substantially eliminates the transmission of vertical vibrations to the compass card from the vehicle on which it is adapted to be mounted.

There is thus provided a novel compass structure embodying novel supporting means therefor, whereby relative movement is obtained between the compass and its support with little or no friction, and whereby transmission of vibrations to the compass from the vehicle on which it is carried are minimized or substantially eliminated.

While only one embodiment of the invention has been illustrated and described and particularly adapted to a compass, it is to be expressly understood, however, that it is not to be limited to such use and may be employed in connection with other instruments of the aircraft type for supporting the same and preventing the transmission thereto of vibrations in a horizontal plane. It will also now be apparent to those skilled in the art, that various changes in the form and relative arrangement of the parts may be made without departing from the spirit and scope of the invention. As pointed out hereinbefore, the springs 26 may take other forms and be arranged in various other ways with respect to the posts 27 and the support 22 or housing 25 than in the manner shown, as long as they are arranged to adapt them for absorbing horizontal vibrations. Reference is, therefore, to be had to the appended claims for a definition of the limits of said invention.

What is claimed is:

1. In a compass of the type including a compass bowl, a horizontal support for the bowl and having openings therein, the combination with said support, of yielding means interposed between the support and bowl for preventing transmission of horizontal vibrations from the support to the bowl, said means comprising a plurality of centering pins carried by the compass bowl and extending through the openings in the support, a housing in each of said openings, bearing washers surrounding the pins and disposed on both sides of the housing and providing bearing surfaces between the support and the compass bowl for reducing friction therebetween to permit and facilitate relative sliding movement in a horizontal plane between said support and said bowl, and a spiral spring for each pin for opposing said sliding movement and disposed within the housing and having one end secured to the latter and the other end to the pin.

2. In a compass of the type including a compass bowl, a horizontal support for the bowl and having a plurality of openings therein, the combination with said support, of yielding means interposed between the support and bowl for preventing transmission of horizontal vibrations from the support to the bowl, said means comprising a plurality of centering pins carried by the compass bowl and extending through the openings in the compass support, bearing washers surrounding the pins and disposed on both sides of the openings and providing bearing surfaces between the support and the compass bowl for reducing friction therebetween to permit and facilitate relative sliding movement in a horizontal plane between said support and said bowl, and a spiral spring for each pin for opposing said sliding movement and disposed within the opening in the support and having one end secured to the latter and the other end to the pin.

3. In a compass of the type including a compass bowl, a horizontal support for the bowl and having a plurality of openings therein, the combination with said support, of yielding means interposed between the support and bowl for preventing transmission of horizontal vibrations from the support to the bowl, said means comprising a plurality of centering pins carried by the compass bowl and extending through the openings in the compass support, bearing washers surrounding the pins and disposed on both sides of the openings and providing bearing surfaces between the support and the compass bowl for reducing friction therebetween to permit and facilitate relative sliding movement in a horizontal plane between said support and said bowl, and a spring for each pin for opposing said sliding movement and disposed horizontally within the opening in the support.

4. In apparatus of the class described, a normally horizontal support having a plurality of openings, an instrument carried by said support and having pins extending through the openings, springs interposed between the walls of the openings and the pins and effective to minimize the transmission of vibrations horizontally from the support to the instrument, bearing washers disposed on both sides of the openings and providing bearing surfaces between the support and the instrument for minimizing friction therebetween to permit and facilitate relative sliding movement in a horizontal plane between said support and said instrument in opposition to the force of the springs, and adjusting means cooperating with the outer ends of the pins to obtain a desired degree of bearing tightness of the washers.

5. In apparatus of the class described, a normally horizontal support having a plurality of openings, an instrument carried by said support and having pins extending through the openings, springs interposed between the walls of the openings and the pins and effective to minimize the transmission of vibrations horizontally from the support to the instrument, and bearing washers disposed on both sides of the openings and providing bearing surfaces between the support and the instrument for reducing friction therebetween to permit and facilitate relative sliding movement in a horizontal plane between said support and said instrument in opposition to the force of said springs.

6. The combination in a compass having a bowl, a compass card pivotally mounted in said bowl, and a horizontal support for the bowl and having a plurality of openings therein, and yielding means interposed between the support and bowl, said means comprising a plurality of centering pins carried by the bowl and extending into the openings in the support, a housing in each of said openings, bearing washers surrounding the pins and disposed on both sides of the housing and providing bearing surfaces between the support and the compass bowl for reducing friction therebetween to permit and facilitate relative sliding movement in a horizontal plane between said support and said bowl, and a spiral spring for each pin for opposing said sliding movement and disposed within the housing and having one end secured to the latter and the other end to the pin.

7. The combination in a compass having a bowl, a compass card pivotally mounted therein, and a support for the bowl having a plurality of openings therein, of yielding means interposed between the support and bowl, said means comprising a plurality of centering pins carried by the bowl and extending into the openings in the support, bearing washers surrounding the pins and disposed on both sides of the openings and providing bearing surfaces between the support and the bowl for reducing friction upon relative sliding movement therebetween in a horizontal plane to facilitate said sliding movement, and a spiral spring for each pin for opposing said sliding movement and disposed within the opening in the support and having one end secured to the latter and the other end to the pin.

8. The combination in a compass having a bowl, a compass card pivotally mounted therein, and a support for the bowl having a plurality of openings therein, of yielding means interposed between the support and bowl for preventing transmission of horizontal vibrations from the support to the bowl, said means comprising a plurality of centering pins carried by the compass bowl and extending into the openings in the compass support, bearing washers surrounding the pins and disposed on both sides of the openings and providing bearing surfaces between the support and the compass bowl for reducing friction upon relative sliding movement therebetween in a horizontal plane to facilitate said sliding movement, and a spring for each pin for opposing said sliding movement and disposed within the opening in the support.

9. In apparatus of the class described, a normally horizontal support having a plurality of openings, an instrument carried by said support and having centering pins extending through said openings, and means for preventing transmission of vibrations horizontally from the support to the instrument, said means comprising a plurality of metal washers, at least one disposed on each side of the support coincident with the openings in the latter and providing bearing surfaces between the support and the instrument for reducing friction therebetween to permit and facilitate relative sliding movement in a horizontal plane between said support and said instrument, a spring for each pin for opposing said sliding movement and disposed within the associated opening in the support, and adjusting means cooperating with the ends of the pins for obtaining a desired degree of bearing tightness of the washers.

10. In apparatus of the class described, a normally horizontal support having a plurality of openings, an instrument carried by said support and having centering pins extending through said openings, and means for preventing transmission of vibrations horizontally from the support to the instrument, said means comprising a plurality of metal washers, at least one disposed on each side of the support coincident with the openings in the latter and providing bearing surfaces between the support and the instrument for reducing friction therebetween to permit and facilitate relative sliding movement in a horizontal plane between said support and said instrument, and a spring for each pin for opposing said sliding movement and disposed within the associated opening in the support.

11. In apparatus of the class described, a normally horizontal support having a plurality of openings, an instrument carried by said support and having centering pins extending through said openings, and means for preventing transmission of vibrations horizontally from the support to the instrument, said means comprising a metal collar tightly fitted in each opening and projecting on either side thereof to provide bearing surfaces on both sides of the support, a plurality of metal washers, at least one disposed on each side of the collar coincident therewith and providing bearing surfaces cooperating with the surfaces of the collar for reducing friction therebetween to permit and facilitate relative sliding movement in a horizontal plane between said support and said instrument, and a spring for each pin for opposing said sliding movement and disposed within the collar in the associated opening in the support.

12. In apparatus of the class described, a normally horizontal support having a plurality of openings therein, an instrument carried by said support and having centering pins extending through said openings, and means for preventing transmission of vibrations horizontally from the support to the instrument, said means comprising a metal collar secured in each opening and projecting at least on that side of the support on which the weight of the instrument is exerted so that the peripheral end face of said collar provides a smooth metallic bearing surface, a metal washer also disposed on that side of the support on which the weight of the instrument is exerted and providing a smooth metallic bearing surface cooperating with the surface presented by the adjacent end face of the collar for reducing sliding friction between the instrument and the support to facilitate relative sliding movement therebetween in a horizontal plane, and a coil spring for each pin for opposing said sliding movement and disposed within the metal collar in the associated opening in the support.

13. A shock absorbing assembly for use in a horizontal anti-vibration support adapted to carry an instrument, comprising a metal collar adapted to be secured in an opening in the support so as to project through said opening at least on that side of the support on which the weight of the instrument is to be exerted, to provide a peripheral end face constituting a metallic bearing surface, a pin projecting through the collar and adapted to have one end thereof secured to a horizontal base of an instrument to be carried by the support, a metal washer disposed about the pin and on the projecting end face of the collar so that said washer and said end face provide substantially frictionless cooperating sliding surfaces to facilitate relative sliding movement between the support and the instrument, and a coil spring disposed in the metal collar and about the pin and having one end connected to said pin and the other end connected to the collar.

14. A shock absorbing assembly for use in a horizontal anti-vibration support adapted to carry an instrument, comprising a metal collar adapted to be rigidly secured in an opening in the support so as to project therethrough on both sides of said support to provide peripheral end faces constituting metallic bearing surfaces, a pin projecting through the collar and adapted to have one end thereof secured to a horizontal base of an instrument to be carried by the support, a pair of metal washers disposed about the pin, one on each end face of the collar so that said washers and the end faces of said collar provide substantially frictionless cooperating sliding surfaces to facilitate relative sliding movement between the support and the instrument, and a coil spring disposed in the metal collar and about the pin and having one end connected to said pin and the other end connected to the collar.

15. In apparatus of the class described, a normally horizontal support having a plurality of openings therein, an instrument carried by said support and having pins extending through said openings, springs interposed between the pins in said openings and the support to minimize the transmission of vibrations horizontally from the support to the instrument, and a bearing washer disposed about each opening at least on that side of the support on which the weight of the instrument is exerted and providing bearing surfaces between the support and the instrument for reducing friction therebetween to permit and facilitate relative sliding movement in a horizontal plane between said support and said instrument in opposition to the force of said springs.

CLARENCE LEE SEWARD, Jr.